Patented July 3, 1923.

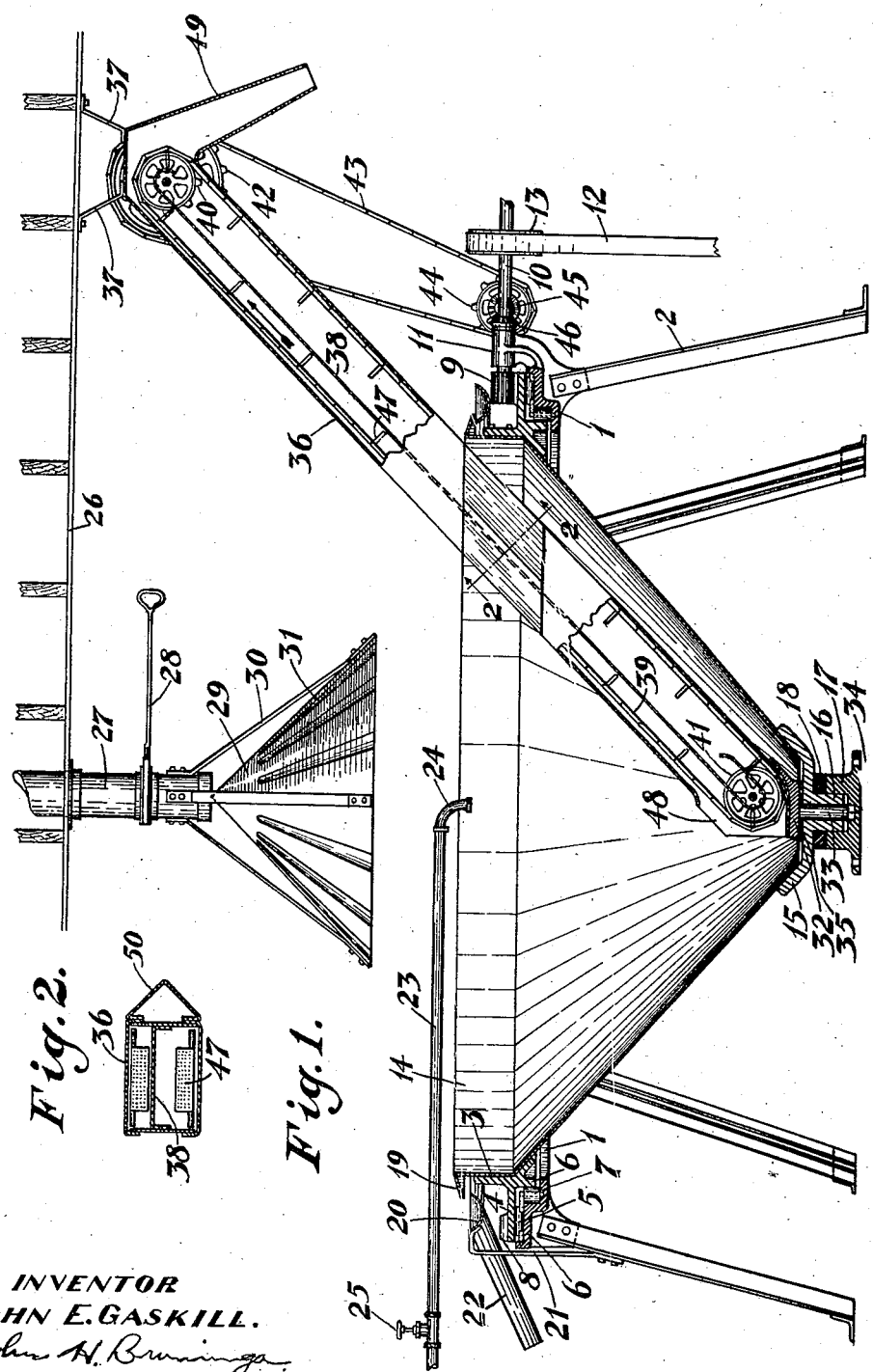

1,460,648

UNITED STATES PATENT OFFICE.

JOHN E. GASKILL, OF ST. LOUIS, MISSOURI.

METHOD OF PURIFYING GARLICKY WHEAT.

Application filed May 23, 1919. Serial No. 299,289.

*To all whom it may concern:*

Be it known that I, JOHN E. GASKILL, a citizen of the United States, and residing at St. Louis, Missouri, have invented a new and useful Improvement in Methods of Purifying Garlicky Wheat, of which the following is a specification.

This invention relates to a method of purifying grain of its impurity, and more particularly for a method of purifying garlicky wheat.

The wild onion or garlic (allium vineale) often occurs as an impurity in wheat; in fact, in some parts it is the worst wheat pest. It is a very objectionable impurity, because it imparts a distasteful garlic flavor to the flour, and this flavor is present even though the percentage of garlic in the wheat is very small. Now wheat grains and green or undried new unmatured wild onion and garlic bulblets are so similar in size and shape that separation is not possible with the sieves in the usual fanning mill; moreover, in the normal state of the wheat and green garlic, the grains and bulblets are not only of the same size and shape, but the difference in specific gravities is not great enough to permit their separation by blowing in a fanning mill.

Various methods have been attempted to separate the garlic from the wheat, but the only method which has obtained any measure of success at all is one in which the wheat with its green garlic is dried artificially, thereby causing the garlic to lose its moisture and thus differentiate considerably in specific gravity from the wheat so as to permit removal of the garlic in a fanning mill. This method does not, however, succeed in insuring removal of the garlic from the wheat, on account of the varying quantities of moisture in different garlic bulblets, due to their different stages of maturity in a given wheat mass; so that after even severe drying, it is found that many of the garlic bulblets are found to contain considerable moisture, while other bulblets in the same lot are shriveled and brittle. The result is, therefore, that even when this method is carried out very carefully, there is still left considerable garlic in the wheat. This method is moreover open to the objection that in drying the green garlic to remove the moisture therefrom, the wheat is dried with it and is, therefore, unfit for milling purposes so that the wheat must again be tempered back to its normal state to increase its moisture to the proper point. Great care must be taken in tempering the wheat back to the normal amount of moisture; and in order to restore the moisture content of the dried wheat to normal, which is so important for good milling, the wheat must be tempered several times and must then be stored a considerable length of time between each tempering in order to allow the moisture to penetrate into the wheat kernel. Moreover, the drying process unless very carefully carried out, and unless low temperatures are employed requiring, therefore, considerable periods of drying, has an injurious effect on the wheat and is liable to destroy its germinating qualities, thereby rendering the wheat unfit for seed purposes.

Some of the objects of this invention, therefore, are to provide a method of purifying garlicky wheat, whereby the wheat will be purified of its green garlic impurity to such an extent as to secure a wheat of high purity, but which is not open to the objectionable features attending the prior methods.

Further objects will appear from the detail description, and in this description reference will be had to an apparatus for carrying out the method embodying this invention, although it is to be understood that this apparatus is only described for the purposes of illustration, since it may be varied without departing from the spirit of this invention.

In accordance with this invention, the grain and its impurity is subjected to a liquid, more specifically stated by dropping the grain and its impurity onto an overflowing liquid of a suitable specific gravity, which has a centrifugal movement imparted thereto, and due to the differences in the specific gravities of the wheat and the green garlic, the garlic is caused to separate from the wheat by flotation.

While wheat and green garlic grains are closely similar in size and shape, and while their specific gravities approach closely and while these similarities are too close to permit separation in the usual fanning mill, it has been found that in the proper method, the differences are sufficient to permit separation by flotation.

In the accompanying drawing, Figure 1 is a vertical section through an apparatus adapted for carrying out the method embodying this invention; and Figure 2 is a section on the line 2—2, Figure 1.

Referring to the drawing, 1 designates the ring of a frame supported on legs 2. A ring 3 has a flange 4 resting on rolls 5 in turn resting on a track 6 on the ring 1; this ring 3 also has a flange 6 bearing against rolls 7 mounted on the ring 1. The flange 4 has a rack 8 with which meshes a pinion 9 mounted on a shaft 10 supported in a bearing 11 on the ring 1 and receiving power from a belt 12 passing over a pulley 13 on the shaft 10 and driven by any suitable motor.

The ring 3 has mounted inside thereof and secured thereto a tank 14 having an inclined bottom and resting on and secured to a bracket 15 closing the same and provided with a bearing 16 engaging a cooperating bearing 17, there being interposed between the bracket 15 and the bearing 17 a washer or suitable bearing element 18 of any suitable form or construction. In this structure therefore, the tank 14 can be revolved by means of any suitable motor through the shaft 10 and the connections heretofore described.

The top of the tank has a downwardly directed flange 19 which discharges into an annular trough 20 supported by brackets 21 on the frame 2 and provided with a discharge spout 22.

A pipe connection 23 has an outlet 24 extending slightly below the upper edge of the tank and is provided with a controlling valve 25, whereby a suitable liquid, as hereinafter described, may be discharged into the tank, the liquid overflowing over the outer edges of the tank and into the trough 20 and from this trough 20 into the spout 22.

Mounted on a suitable support 26 is a discharge pipe 27 for the grain and which is provided with a cut-off slide 28. Mounted below the open end of the pipe 27 is a cone 29 supported by straps 30 from the pipe 27 and having its apex centrally of and at the discharge opening of the pipe and having its lower end a distance of, about twelve inches from the top of the tank. This cone is, however, provided with ridges or grooves 31 extending downwardly and radiating so as to guide the grain and distribute the same uniformly over the cone so that it will descend in a shower into the tank.

Mounted in the bottom of the tank is a bracket 32 having a shank 33 extending through the bearing 16 and provided with an angular portion 34 taking into an angular recess in the bearing 17 so as to prevent the support 32 from turning. A bearing washer 35 is interposed between the brackets 32 and 15. A casing 36 is supported at its lower end on the bracket 32 and is supported by straps 37 from the support 26. This casing has a partition 38 extending therealong and forming a guide for the grain and this partition is perforated. Moving in the casing are a pair of endless chains 39 which pass over sprockets 40 at the upper end of the casing and over guides 41 at the lower end of the casing, these sprockets and guides being mounted on transverse shafts and the upper shaft having attached thereto outside of the casing a sprocket 42 connected by a chain 43 with a sprocket 44 on a transverse shaft supported on the bearing block 11 and provided with a bevel gear 45 meshing with a bevel gear 46 on the shaft 10. The chains 39 have attached thereto flights 47 which are also perforated. The casing 36 is open at its lower end as shown at 48 and is provided at its upper end with a spout 49. The leading side of the casing is provided near the top of the tank with a wedge-shaped deflector 50 for the purpose hereinafter to be described.

Assuming the power to be applied to the shaft 10, the tank is rotated and the direction of rotation is as shown in Figure 1 that it will rotate from right to left. This also causes the chains to move in the direction of the arrow, Figure 1. The tank being filled with the liquid and the flow being controlled so as to continually overflow, the liquid will be moved out radially by a centrifugal force, the magnitude of this force depending upon the speed of rotation of the tank, and the overflowing liquid will pass into the trough 20 and will be discharged into the spout 22. Assuming now that the slide 28 is open and that the unpurified wheat, containing the garlic as an impurity, is allowed to discharge, the grain and its impurity will be distributed by the cone and will drop onto the surface of the centrifugally moving liquid in the tank. As the grain and its impurity drop into the tank, they will be subjected to two physical actions, namely, the buoyancy action of the liquid and the centrifugal action of the overflowing and centrifugally moving liquid. Both of these actions will cause the lighter or more susceptible garlic component to tend to move towards the rim of the tank and follow the overflowing liquid to a greater extent than the heavier or less susceptible wheat component. It is, therefore, found that with the proper speed of rotation of the tank, the proper overflowing, the proper distribution and drop of the grain and its impurity and the proper specific gravity liquid, that the wheat and garlic will be separated by flotation, the garlic overflowing over the edge of the tank being discharged into the trough 20 and the spout 22, while the wheat will sink to the bottom of the tank. As the wheat collects on the bottom of the tank, it is taken by the elevator flights 47 and carried upwardly along the casing 36, where it is discharged through the spout 49. The perforated partition 38 and the perforated flights cause the liquid to drain from the wheat as it rises through the casing. During rotation of the tank, the deflector 50 deflects the material and, therefore, prevents clogging.

The liquid employed is preferably water and to enhance the separating action, it is desirable to increase the specific gravity of the water by adding thereto any suitable soluble substance, such as common salt and it has been found that a specific gravity of from about 1.020 to 1.080 will give good results. This specific gravity is intermediate the specific gravities of the wheat and its associated garlic in the normal or green condition. However, good results can be obtained with ordinary water, if the centrifugal action is increased, due to the fact that as explained above, the separation is due to two physical factors, namely, the buoyancy of the liquid and the centrifugal action.

The wheat as discharged from the spout 49 can be dried in any suitable manner and by any of the drying mediums and devices well known in the prior art, until the moisture is reduced to the proper point. It is, therefore, unnecessary to explain in detail the method of drying.

It is, therefore, to be seen that the invention accomplishes its objects. The separation is obtained in a simple and effective manner and permits the employment of an apparatus whereby the operation may be continuous. With this method, the wheat can be cleaned of substantially all of its garlic and this is obtained without damaging the wheat in any way. By dropping the wheat and its impurity at a plurality of points and centrally onto a centrifugally moving and overflowing liquid, it is not only insured but both wheat and garlic will become uniformly wet, thereby causing the wheat to sink and thus all becoming separated, but this permits uniform distribution of the material upon the liquid so that the action of separation will be a uniform one.

While there is described an apparatus for carrying out the method and while the method itself has been described in detail, it is obvious that various changes may be made in details without departing from the spirit of this invention; it is, therefore, to be understood that this invention is not to be limited to the specific details described and shown.

Having thus described the invention, what is claimed is:

1. The method of purifying normal wheat of its associated green garlic, comprising, immersing the grain and its garlic impurity in their normal states in a liquid of a suitable specific gravity so as to cause the impurity to separate from the grain by flotation, and separately withdrawing the grain and impurity so separated.

2. The method of purifying normal wheat of its associated green garlic, comprising, immersing the grain and its garlic impurity in their normal states in a liquid of a specific gravity intermediate the specific gravities of the grain and its impurity so as to cause the impurity to separate from the grain by flotation, and separately withdrawing the grain and impurity so separated.

3. The method of purifying normal wheat of its associated green garlic, comprising, dropping the grain and its garlic impurity in their normal states at a plurality of points into a liquid of a suitable specific gravity in order to immerse them so as to cause the impurity to separate from the grain by flotation, and separately withdrawing the grain and impurity so separated.

4. The method of purifying normal wheat of its associated green garlic, comprising, dropping the grain and its garlic impurity in their normal states into a rapidly flowing liquid of a suitable specific gravity in order to immerse them so as to cause the impurity to separate from the grain by flotation, and separately withdrawing the grain and impurity so separated.

5. The method of purifying normal wheat of its associated green garlic, comprising, dropping the grain and its garlic impurity in their normal states centrally of and onto a centrifugally flowing liquid of a suitable specific gravity in order to immerse them so as to cause the impurity to separate from the grain by flotation, and separately withdrawing the grain and impurity so separated.

6. In the art of purifying normal wheat of its associated green garlic, the process comprising, separating the green impurity from the normal grain by differences in their specific gravities.

7. In the art of purifying normal wheat of its associated green garlic, the process comprising, separating the green impurity from the normal grain by differences in their specific gravities, by immersing the same in a liquid of suitable specific gravity so as to cause the impurity to separate from the grain by flotation.

In testimony whereof I affix my signature this 10th day of May, 1919.

JOHN E. GASKILL.